(12) United States Patent
Yi et al.

(10) Patent No.: US 10,512,096 B2
(45) Date of Patent: Dec. 17, 2019

(54) METHOD FOR TRANSMITTING DATA IN DUAL CONNECTIVITY AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 46 days.

(21) Appl. No.: 15/740,752

(22) PCT Filed: Jun. 17, 2016

(86) PCT No.: PCT/KR2016/006477
§ 371 (c)(1),
(2) Date: Dec. 28, 2017

(87) PCT Pub. No.: WO2017/003118
PCT Pub. Date: Jan. 5, 2017

(65) Prior Publication Data
US 2018/0199354 A1   Jul. 12, 2018

Related U.S. Application Data

(60) Provisional application No. 62/191,532, filed on Jul. 13, 2015, provisional application No. 62/187,257, filed on Jul. 1, 2015.

(51) Int. Cl.
*H04W 72/12*   (2009.01)
*H04W 76/10*   (2018.01)
(Continued)

(52) U.S. Cl.
CPC ......... *H04W 72/1215* (2013.01); *H04L 5/001* (2013.01); *H04L 5/0035* (2013.01);
(Continued)

(58) Field of Classification Search
CPC ......... H04W 72/1215; H04W 28/0278; H04W 72/1284; H04W 28/22; H04W 72/14
See application file for complete search history.

(56) References Cited

U.S. PATENT DOCUMENTS

| 2014/0126399 A1 | 5/2014 | Damnjanovic et al. |
| 2015/0117241 A1 | 4/2015 | Koc et al. |
| 2017/0111927 A1* | 4/2017 | Kim .................. H04W 28/0278 |

FOREIGN PATENT DOCUMENTS

| WO | 2014109558 | 7/2014 |
| WO | 2015012546 | 1/2015 |

(Continued)

OTHER PUBLICATIONS

PCT International Application No. PCT/KR2016/006477, Notification of Transmittal of the International Search Report and the Written Opinion of the International Searching Authority, or Declaration dated Sep. 23, 2016, 9 pages.

(Continued)

*Primary Examiner* — Mohammad S Anwar
(74) *Attorney, Agent, or Firm* — Lee Hong Degerman Kang & Waimey

(57) ABSTRACT

The present invention relates to a wireless communication system. More specifically, the present invention relates to a method and a device for transmitting data in dual connectivity, the method comprising: configuring that UL data is only to be transmitted to the first eNB, if an amount of data available for transmission in a PDCP entity is less than a threshold, receiving a PDCP data from an upper layer, transmitting a BSR to request an UL grant to the second eNB, receiving the UL grant from the second eNB, and transmitting the PDCP data using the UL grant to the second eNB if an amount of the PDCP data has been indicated to the second eNB by the BSR.

16 Claims, 14 Drawing Sheets

(51) Int. Cl.
*H04W 28/02* (2009.01)
*H04L 12/815* (2013.01)
*H04L 12/819* (2013.01)
*H04L 5/00* (2006.01)
*H04W 28/22* (2009.01)
*H04W 72/14* (2009.01)
*H04W 88/06* (2009.01)

(52) U.S. Cl.
CPC ......... *H04L 5/0044* (2013.01); *H04L 5/0053* (2013.01); *H04L 47/215* (2013.01); *H04L 47/22* (2013.01); *H04W 28/02* (2013.01); *H04W 28/0278* (2013.01); *H04W 28/22* (2013.01); *H04W 72/1284* (2013.01); *H04W 72/14* (2013.01); *H04W 76/10* (2018.02); *H04W 88/06* (2013.01)

(56) References Cited

FOREIGN PATENT DOCUMENTS

| WO | 2015020461 | 2/2015 |
| WO | 2015062085 | 5/2015 |

OTHER PUBLICATIONS

Samsung, "Data to be considered for BSR in uplink split bearer", 3GPP TSG RAN WG2 Meeting #90, R2-152263, May 2015, 2 pages.
LG Electronics, "Details of threshold based BSR trigger for split bearer", 3GPP TSG RAN WG2 Meeting #90, R2-152370, May 2015, 2 pages.
European Patent Office Application Serial No. 16818151.9, Search Report dated Dec. 19, 2018, 10 pages.
LG Electronics, "Data transmission for uplink split bearer", 3GPP TSG RAN WG2 Meeting #90, R2-152372, May 2015, 2 pages.
LG Electronics, "UP Radio Protocol for Dual Connectivity", 3GPP TSG RAN WG2 Meeting #81bis, R2-131231, Apr. 2013, 7 pages.
Ericsson, "PDCP data transfer procedure for uplink bearer split", 3GPP TSG RAN WG2 Meeting #90, R2-152330, XP050972638, May 2015, 6 pages.
LG Electronics, "Report of the LTE UP ad hoc meeting", 3GPP TSG RAN WG2 Meeting #90, R2-152831, XP050981387, May 2015, 16 pages.

* cited by examiner (a) Control-Plane Protocol Stack (b) User-Plane Protocol Stack

METHOD FOR TRANSMITTING DATA IN DUAL CONNECTIVITY AND A DEVICE THEREFOR

CROSS-REFERENCE TO RELATED APPLICATIONS

This application is the National Stage filing under 35 U.S.C. 371 of International Application No. PCT/KR2016/006477, filed in Jun. 17, 2016, which claims the benefit of U.S. Provisional Application Nos. 62/187,257, filed on Jul. 1, 2015 and 62/191,532, filed on Jul. 13, 2015, the contents of which are all hereby incorporated by reference herein in their entirety.

TECHNICAL FIELD

The present invention relates to a wireless communication system and, more particularly, to a method for transmitting data in dual connectivity and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for transmitting data in dual connectivity. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

To avoid waste of radio resource in an UL split bearer, it is invented that a UE transmits a packet data convergence protocol (PDCP) data to an eNB, which is configured not to transmit the PDCP data when an amount of data available for transmission in PDCP (DATP) is less than a threshold, if the UE already transmitted buffer status report (BSR) to the eNB to indicate an amount of the PDCP data.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
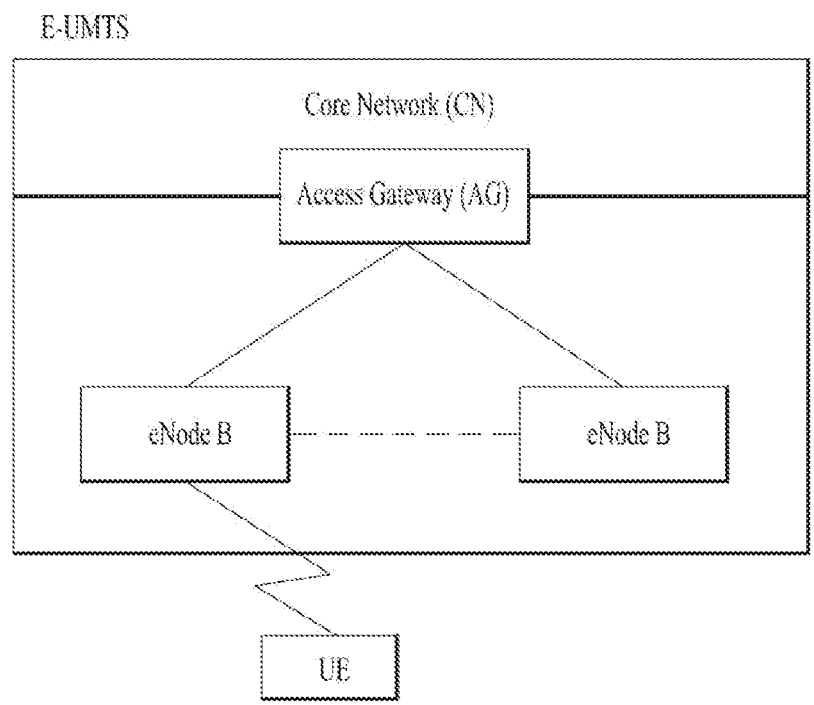
FIG. 1 is a diagram showing a network structure of an Evolved Universal Mobile Telecommunications System (E-UMTS) as an example of a wireless communication system.
Figure 2A:
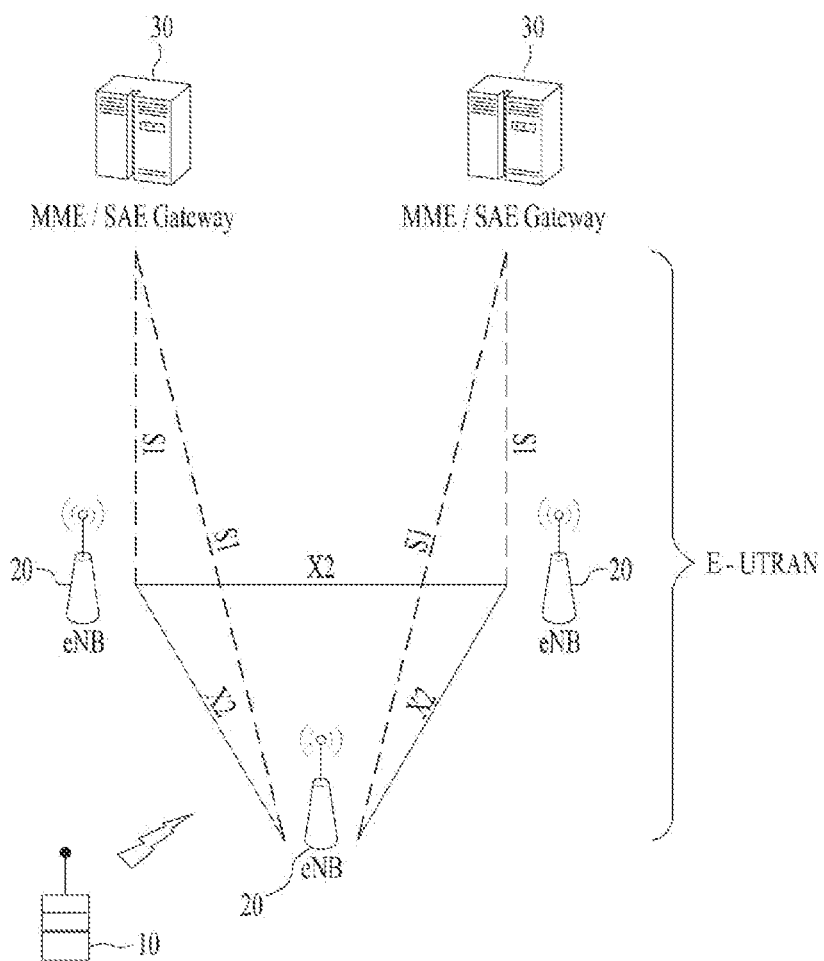
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
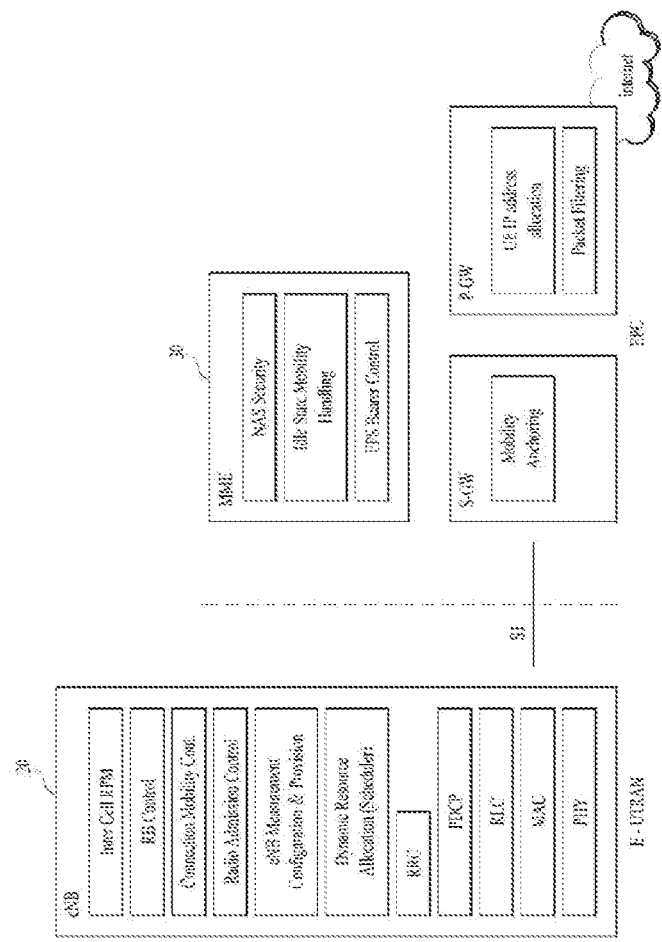
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an Si interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
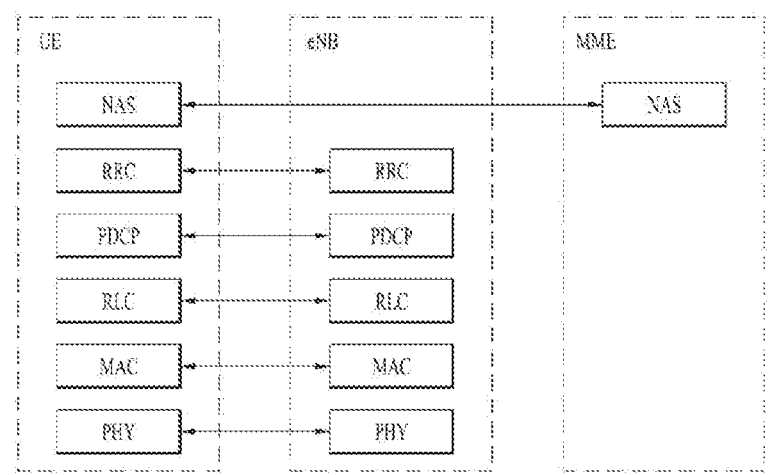
FIG. 3 is a diagram showing a control plane and a user plane of a radio interface protocol between a UE and an E-UTRAN based on a 3rd generation partnership project (3GPP) radio access network standard.
Figure 3:
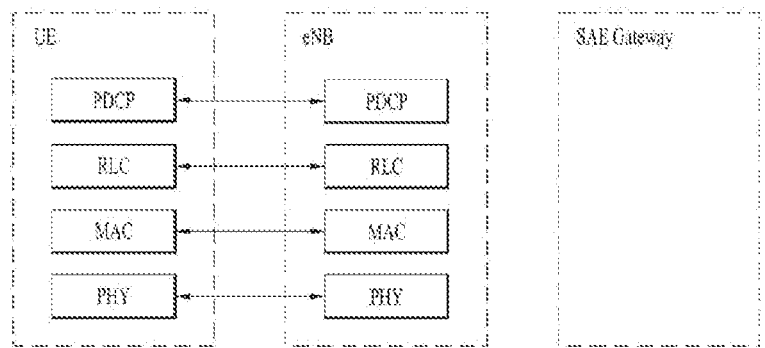

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
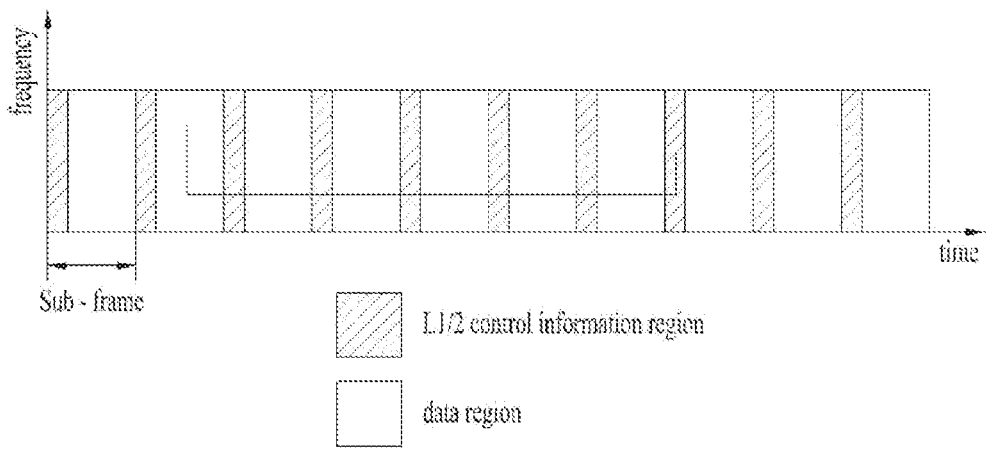
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
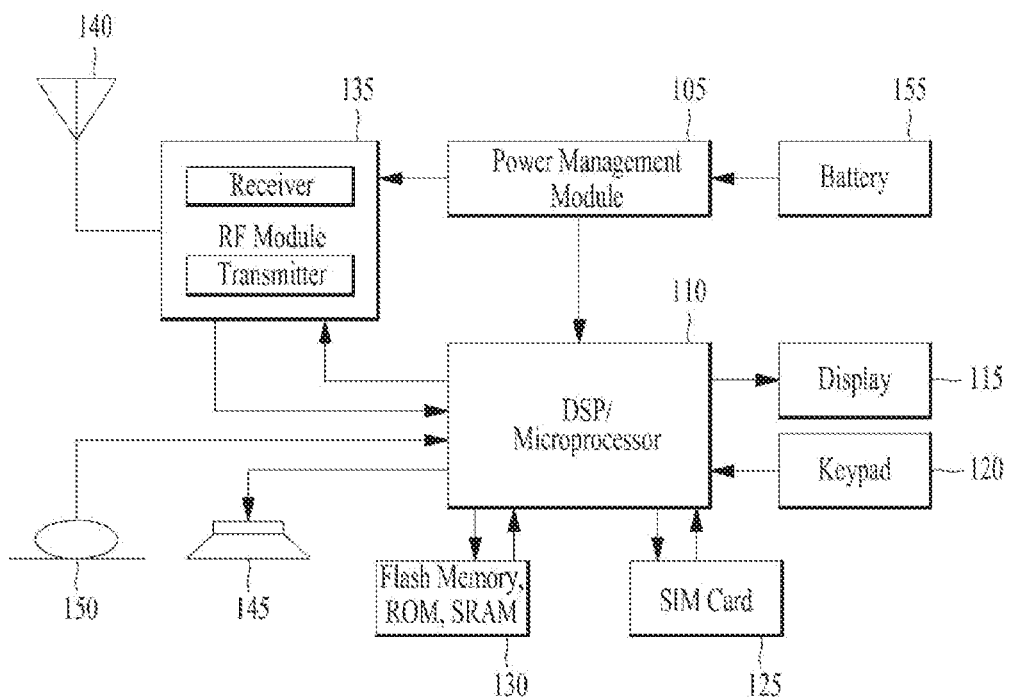
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver;

135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
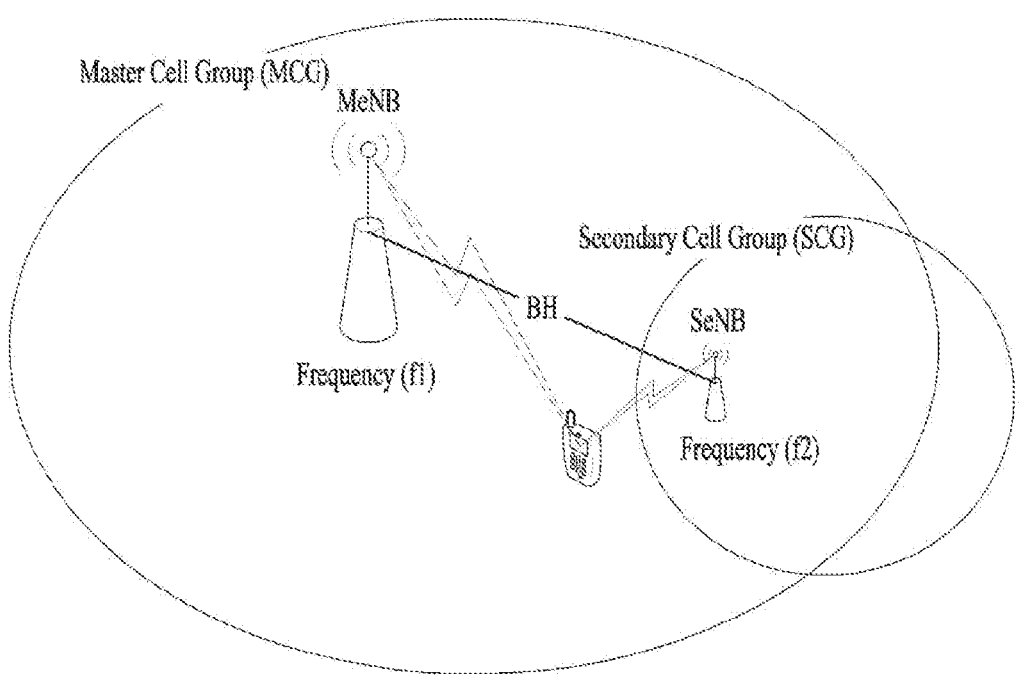
FIG. 6 is a conceptual diagram for Dual Connectivity (DC) between a Master Cell Group (MCS) and a Secondary Cell Group (SCG)

FIG. 6 is a conceptual diagram for Dual Connectivity (DC) between a Master Cell Group (MCG) and a Secondary Cell Group (SCG).

The Dual Connectivity (DC) means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With Dual Connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

For SCG, the following principles are applied: i) at least one cell in SCG has a configured UL CC and one of them, named PSCell, is configured with PUCCH resources; ii) RRC connection Re-establishment procedure is not triggered; iii) for split bearers, the DL data transfer over the MeNB is maintained; iv) PSCell cannot be de-activated; and v) PSCell can only be changed with SCG change (i.e. with security key change and RACH procedure).

With respect to the interaction between MeNB and SeNB, the following principles are applied: i) the MeNB maintains the RRM measurement configuration of the UE and may, e.g, based on received measurement reports or traffic conditions or bearer types, decide to ask a SeNB to provide additional resources (serving cells) for a UE; ii) upon receiving the request from the MeNB, a SeNB may create the container that will result in the configuration of additional serving cells for the UE (or decide that it has no resource available to do so); iii) for UE capability coordination, the MeNB provides (part of) the AS configuration and the UE capabilities to the SeNB; iv) the MeNB and the SeNB exchange information about UE configuration by means of RRC containers (inter-node messages) carried in X2 messages; v) the SeNB may initiate a reconfiguration of its existing serving cells (e.g., PUCCH towards the SeNB); vi) the SeNB decides which cell is the PSCell within the SCG; and vii) the MeNB does not change the content of the RRC configuration provided by the SeNB.

Figure 7:
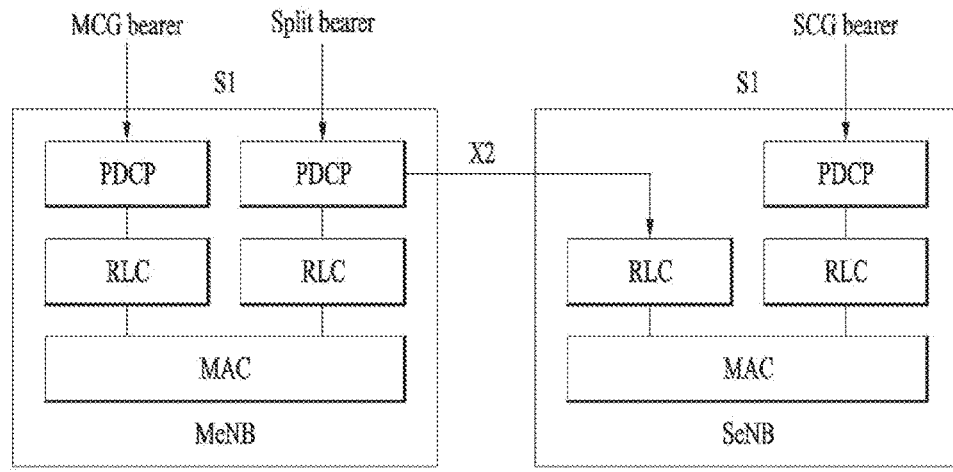
FIG. 7 is a conceptual diagram for radio protocol architecture for dual connectivity.

FIG. 7 is a conceptual diagram for radio protocol architecture for dual connectivity.

E-UTRAN of the present example can support dual connectivity operation whereby a multiple receptions/transmissions(RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer, split bearer and SCG bearer. Those three alternatives are depicted on FIG. 7. The SRBs (Signaling Radio Bearers) are always of the MCG bearer and therefore only use the radio resources provided by the MeNB. The MCG bearer is a radio protocol only located in the MeNB to use MeNB resources only in the dual connectivity. And the SCG bearer is a radio protocol only located in the SeNB to use SeNB resources in the dual connectivity.

Figure 8:
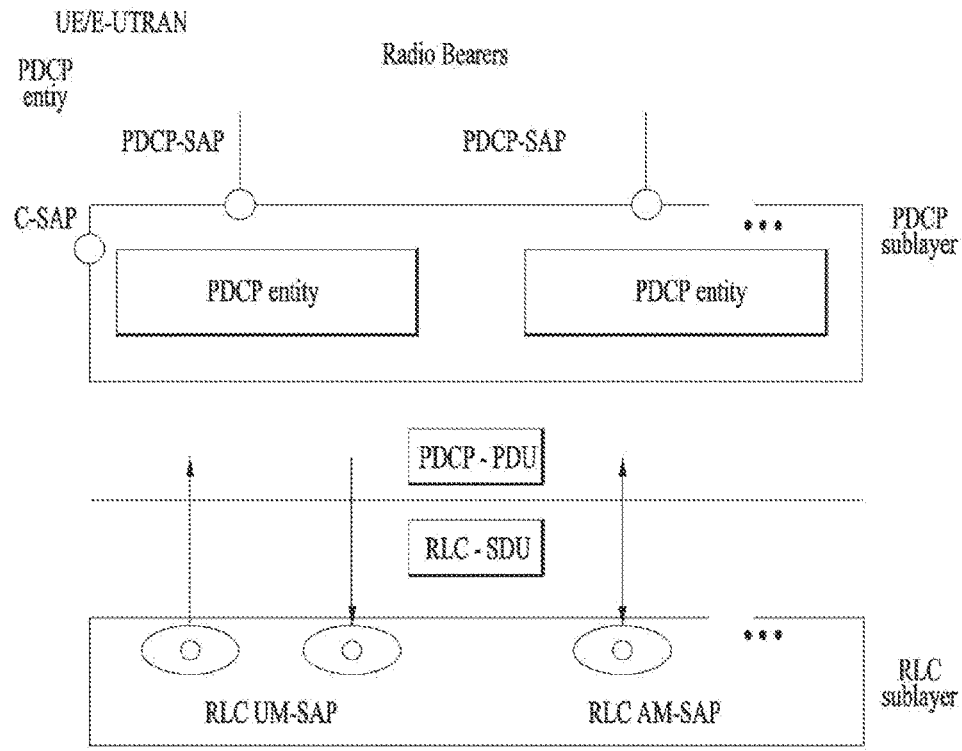
FIG. 8 is a conceptual diagram for a PDCP entity architecture.

Specially, the split bearer is a radio protocol located in both the MeNB and the SeNB to use both MeNB and SeNB resources in the dual connectivity and the split bearer may be a radio bearer comprising one Packet Data Convergence Protocol (PDCP) entity, two Radio Link Control (RLC) entities and two Medium Access Control (MAC) entities for one direction. FIG. 8 is a conceptual diagram for a PDCP entity architecture.

The expected benefits of the split bearer are: i) the SeNB mobility hidden to CN, ii) no security impacts with ciphering being required in MeNB only, iii) no data forwarding between SeNBs required at SeNB change, iv) offloads RLC processing of SeNB traffic from MeNB to SeNB, v) little or no impacts to RLC, vi) utilization of radio resources across MeNB and SeNB for the same bearer possible, vii) relaxed requirements for SeNB mobility (MeNB can be used in the meantime).

Meanwhile, in LTE-WLAN radio level integration, the radio protocol architecture that a particular bearer uses depends on the LTE-WLAN Aggregation (LWA) backhaul scenario and how the bearer is set up. For the LTE-WLAN radio level integration, similar architecture as dual connectivity can be used. The only change is to replace SeNB by WLAN. Thus, all functions depending on the split bearer can be applied on all technical areas to be used the split bearer. For example, if a structure of the split bearer is applied in a new RAT to be used in 5G network, the all functions depending on the split bearer can be applied on the new RAT.

FIG. 8 is a conceptual diagram for a PDCP entity architecture.

FIG. 8 represents one possible structure for the PDCP sublayer, but it should not restrict implementation. Each RB (i.e. DRB and SRB, except for SRB0) is associated with one PDCP entity. Each PDCP entity is associated with one or two (one for each direction) RLC entities depending on the RB characteristic (i.e. unidirectional or bi-directional) and RLC mode. The PDCP entities are located in the PDCP sublayer. The PDCP sublayer is configured by upper layers.

Figure 9:
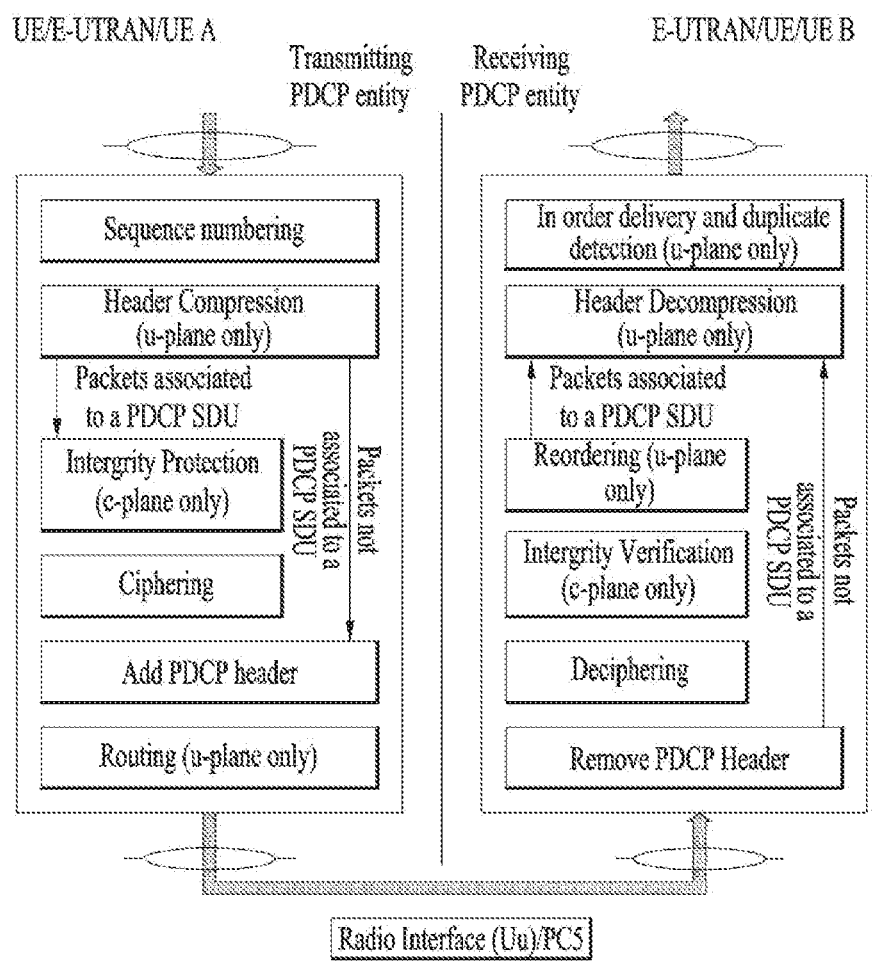
FIG. 9 is a conceptual diagram for functional view of a PDCP entity.

FIG. 9 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 9 represents the functional view of the PDCP entity for the PDCP sublayer; it should not restrict implementation. The figure is based on the radio interface protocol architecture.

For the purpose of MAC buffer status reporting, the UE may consider PDCP Control PDUs, as well as the following as data available for transmission (DAT) in the PDCP layer, for SDUs for which no PDU has been submitted to lower layers: i) the SDU itself, if the SDU has not yet been processed by PDCP, or ii) the PDU if the SDU has been processed by PDCP.

In addition, for radio bearers that are mapped on RLC AM, if the PDCP entity has previously performed the re-establishment procedure, the UE may also consider the following as data available for transmission in the PDCP layer, for SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received: i) the SDU, if it has not yet been processed by PDCP, or ii) the PDU once it has been processed by PDCP.

For split bearers, when indicating the data available for transmission to the MAC entity for BSR triggering and Buffer Size calculation, the UE shall indicate the data available for transmission to the MAC entity configured for SCG only if ul-DataSplitDRB-ViaSCG is set to TRUE by upper layer. And if else, the UE shall indicate the data available for transmission to the MAC entity configured for MCG only.

When submitting PDCP PDUs to lower layers, the transmitting PDCP entity shall submit the PDCP PDUs to the associated AM RLC entity configured for SCG if ul-DataSplitDRB-ViaSCG is set to TRUE by upper layers. And if else, the transmitting PDCP entity shall submit the PDCP PDUs to the associated AM RLC entity configured for MCG. Here, the ul-DataSplitDRB-ViaSCG indicates that whether the UE shall send PDCP PDUs via SCG as specified in TS 36.323. E-UTRAN only configures the field (i.e. indicates value TRUE) for split DRBs.

Figure 10:
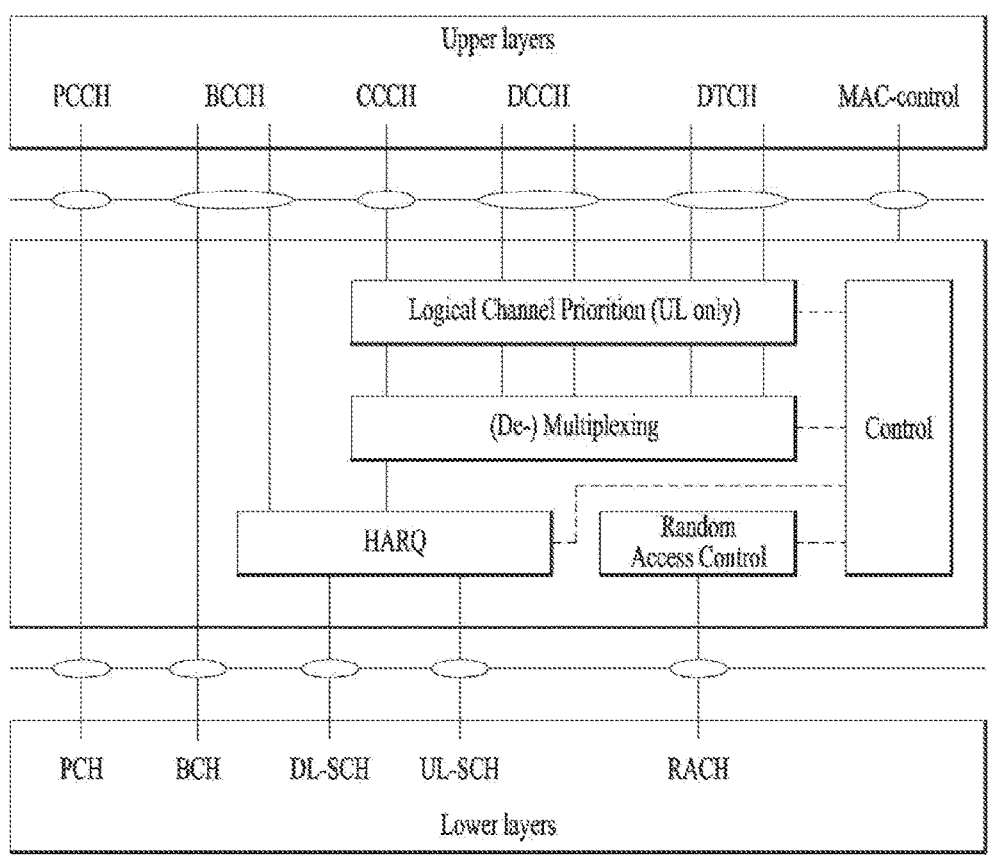
FIG. 10 is a diagram for MAC structure overview in a UE side.

FIG. 10 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical-channel types specified for LTE includes:

The Broadcast Control Channel (BCCH), used for transmission of system information from the network to all terminals in a cell. Prior to accessing the system, a terminal needs to acquire the system information to find out how the system is configured and, in general, how to behave properly within a cell.

The Paging Control Channel (PCCH), used for paging of terminals whose location on a cell level is not known to the network. The paging message therefore needs to be transmitted in multiple cells.

The Common Control Channel (CCCH), used for transmission of control information in conjunction with random access.

The Dedicated Control Channel (DCCH), used for transmission of control information to/from a terminal. This channel is used for individual configuration of terminals such as different handover messages.

The Multicast Control Channel (MCCH), used for transmission of control information required for reception of the MTCH.

The Dedicated Traffic Channel (DTCH), used for transmission of user data to/from a terminal. This is the logical channel type used for transmission of all uplink and non-MBSFN downlink user data.

The Multicast Traffic Channel (MTCH), used for downlink transmission of MBMS services.

In Dual Connectivity, two MAC entities are configured in the UE: one for the MCG and one for the SCG. Each MAC entity is configured by RRC with a serving cell supporting PUCCH transmission and contention based Random Access.

The functions of the different MAC entities in the UE operate independently in principle. The timers and parameters used in each MAC entity are configured independently in principle. The Serving Cells, C-RNTI, radio bearers, logical channels, upper and lower layer entities, LCGs, and HARQ entities considered by each MAC entity refer to those mapped to that MAC entity in principle. Exceptively, if otherwise indicated, the different MAC entities can be performed dependently.

Figure 11:
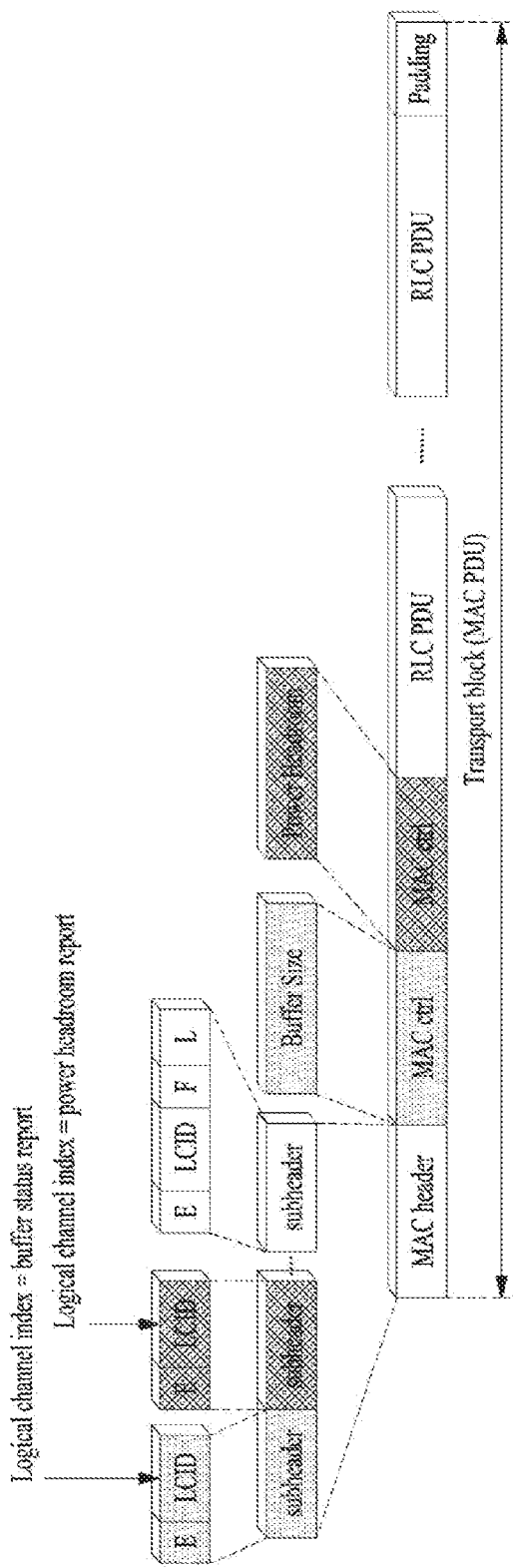
FIG. 11 is a diagram for signaling of buffer status.

FIG. 11 is a diagram for signaling of buffer status.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

Meanwhile, terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report, as illustrated in FIG. 11.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data available transmission across all logical channels in a logical-channel group.

The Buffer Status Reporting (BSR) procedure is used to provide a serving eNB with information about the amount of DAT in the UL buffers of the UE. RRC may control BSR reporting by configuring the three timers periodicBSR-Timer and retxBSR-Timer and logicalChannelSR-Prohibit-Timer and by, for each logical channel, optionally signaling Logical Channel Group (LCG) which allocates the logical channel to an LCG. A buffer status report represents one or all four logical-channel groups and can be triggered for the following reasons:

i) Arrival of data with higher priority than currently in the transmission buffer-that is, data in a logical-channel group with higher priority than the one currently being transmitted-as this may impact the scheduling decision. The UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR".

ii) Change of serving cell, in which case a buffer-status report is useful to provide the new serving cell with information about the situation in the terminal.

iii) Periodically as controlled by a timer. A retxBSR-Timer expires and the UE has data available for transmission for any of the logical channels which belong to a LCG, in which case the BSR is referred below to as "Regular BSR", or a periodicBSR-Timer expires, in which case the BSR is referred below to as "Periodic BSR".

iv) Instead of padding. UL resources are allocated and number of padding bits is equal to or larger than the size of the Buffer Status Report MAC control element plus its subheader, in which case the BSR is referred below to as "Padding BSR". If the amount of padding required to match the scheduled transport block size is larger than a buffer-status report, a buffer-status report is inserted. Clearly it is better to exploit the available payload for useful scheduling information instead of padding if possible.

For Regular BSR, if the BSR is triggered due to data becoming available for transmission for a logical channel for which logicalChannelSR-ProhibitTimer is configured by upper layers, the MAC entity starts the logicalChannelSR-ProhibitTimer if not running If running, the MAC entity stops the logicalChannelSR-ProhibitTimer.

For Regular and Periodic BSR, if more than one LCG has data available for transmission in the TTI where the BSR is transmitted, the UE may report Long BSR. If else, the UE may report Short BSR.

If the Buffer Status reporting procedure determines that at least one BSR has been triggered and not cancelled, if the UE has UL resources allocated for new transmission for this TTI, the UE may instruct the Multiplexing and Assembly procedure to generate the BSR MAC control element(s), start or restart periodicBSR-Timer except when all the generated BSRs are Truncated BSRs, and start or restart retxBSR-Timer.

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

As discussed above, in order to request an UL grant having a proper amount of UL resources, a UE can transmit a BSR to at least one eNB. For triggering the BSR, a PDCP entity can indicate an amount of data available for transmission in PDCP entity (DATP) to at least one MAC entity. When the UE receives the UL grant, the UE can transmit UL data using the UL grant.

For UL split bearers in Rel-12, the UE indicates the DATP to only one MAC entity depending on the configuration (ul-DataSplitDRB-ViaSCG). For the other MAC entity, the UE does not indicate DATP at all.

In Rel-13, indication behavior of the PDCP entity is changed due to the introduction of threshold, as shown below.

If the PDCP data amount is larger than or equal to the threshold, both MAC entities trigger BSRs and if the PDCP data amount is less than threshold, only one MAC entity triggers BSR. If ul-DataSplitDRB-ViaSCG is set to TRUE by upper layer, the PDCP entity indicates DATP to the MAC entity configured for SCG only. And else, the PDCP entity indicates DATP to the MAC entity configured for MCG only.

There are some agreements for UE operation regarding UL data transmission in dual connectivity, according to the mentioned above: (1) a PDCP entity is indicated by ul-DataSplitDRB-ViaSCG-r12 to which eNB among a MeNB and a SeNB UE shall trigger BSR when an amount of DATP is less than a threshold; (2) the PDCP entity reports buffer status for an UL bearer split only towards the eNB indicated by ul-DataSplitDRB-ViaSCG-r12 when the amount of the DATP is less than the threshold; (2a) PDCP entity reports buffer status for an UL bearer split towards the both of the MeNB and the SeNB when the amount of the DATP is above the threshold; (3) PDCP entity transmits PDCP PDU for an UL bearer split only towards the eNB indicated by ul-DataSplitDRB-ViaSCG-r12 when the amount of the DATP is less than the threshold; (4) BSR triggering, Buffer Size calculation, and data transmission is aligned; and (0) the threshold is configured per radio bearer.

Followings are examples of UE operation according to the agreements as discussed above.

In a first case, if PDCP SDU (whose size is X, where X<threshold (Th)) arrives when PDCP buffer is empty, PDCP entity indicates X to MAC entity for SeNB (S-MAC), and S-MAC triggers BSR. In this case, X is reported to S-MAC for buffer status (BS) calculation in the S-MAC, and 0 is reported to MAC entity for MeNB (M-MAC) for buffer status calculation in M-MAC.

In a second case, if PDCP SDU (whose size is X, where X>Th) arrives when PDCP buffer is empty, PDCP indicates X to both M-MAC and S-MAC, and M-MAC and S-MAC triggers BSR. In this case, X is reported to S-MAC for BS calculation in S-MAC, and X is reported to M-MAC for BS calculation in M-MAC.

In a third case, if PDCP SDU (whose size is X) arrives when a size of data in PDCP buffer is Y (where Y<Th and X+Y<Th), there is no BSR triggering.

In a fourth case, if PDCP SDU (whose size is X) arrives when data amount in PDCP buffer is Y (where Y<Th and X+Y>Th), PDCP entity indicates X+Y to M-MAC, and M-MAC triggers BSR.

In a fifth case, if PDCP SDU (whose size is X) arrives when data amount in PDCP buffer is Y (where Y>Th and X+Y>Th), there is no BSR triggering.

In a sixth case, when data amount in PDCP buffer changes from Y to X (where Y>Th and X<Th), there is no BSR triggering.

Meanwhile, when an amount of DATP is above the threshold, PDCP entity indicates the DATP to both of a MAC entity for MeNB and a MAC entity for SeNB, for BSR triggering and buffer status calculation. After that, if UL grant is received from one of the MeNB and the SeNB, the PDCP entity can transmit part of DATP to the one of the MeNB and the SeNB using the received UL grant. In this case, remaining amount of DATP may become below the threshold.

According to the agreements, if an amount of DATP is below the threshold, the DATP is transmitted to only one configured eNB (configured by ul-DataSplitDRB-ViaSCG, a first eNB in the following). It means that the remaining amount of DATP cannot be transmitted to a second eNB different from the first eNB (i.e., eNB which is not configured by ul-DataSplitDRB-ViaSCG), even if UL grant is received from the second eNB.

In other words, the UE transmits BSR to the second eNB indicating the amount of DATP to request UL grant, and the second eNB gives UL grant to the UE to transmit the DATP, but the UE cannot transmit the DATP to the second eNB due to the restriction of threshold (i.e. if the amount of DATP is below the threshold, the DATP is transmitted to only one configured eNB, the first eNB).

The problem may happen frequently if the amount of data fluctuates around the threshold. Once it happens, the UE fills the UL grant received from the second eNB with padding, which leads to waste of radio resource. A specific example regarding the problem will be discussed with reference to FIG. 12.

Figure 12:
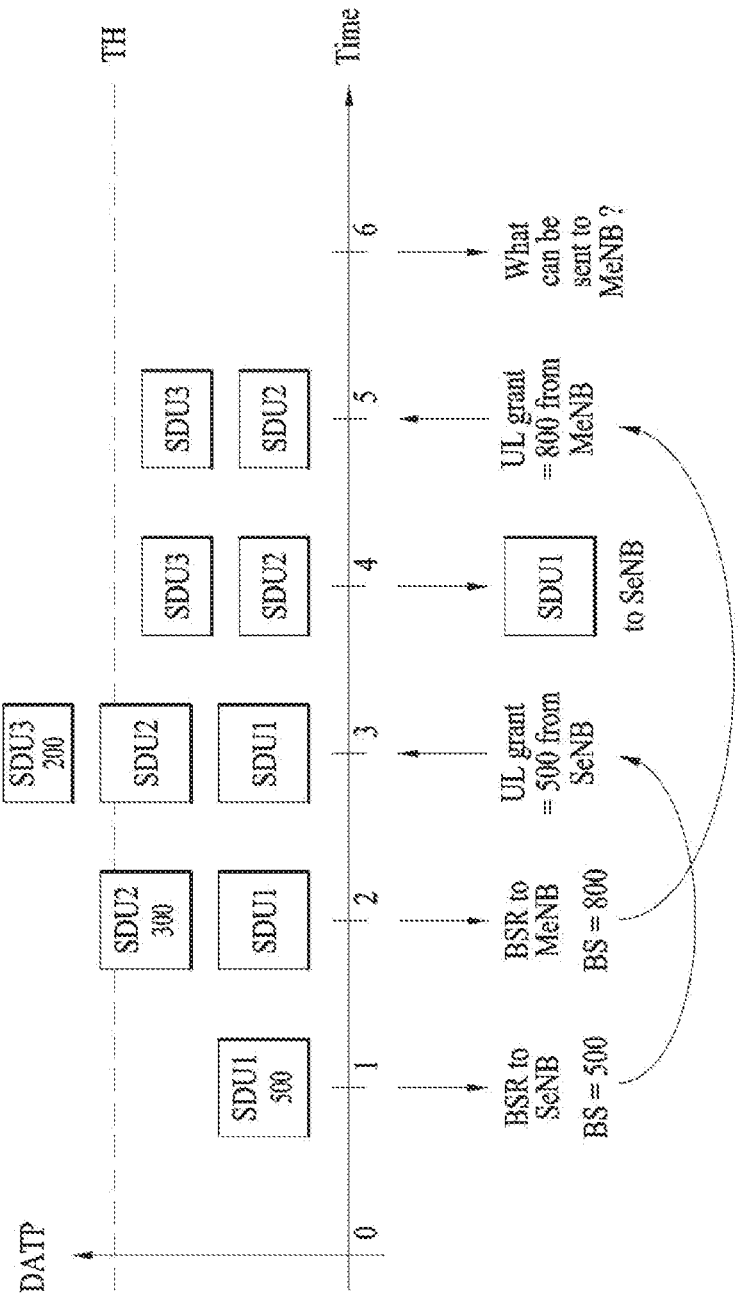
FIG. 12 shows an exemplary problem regarding UL data transmission in dual connectivity.

FIG. 12 shows an exemplary problem regarding UL data transmission in dual connectivity.

In FIG. 12, it is assumed that DATP could be transmitted to only SeNB if an amount of the DATP is below a threshold. It is also assumed that the threshold (TH) is set to 700 bytes.

Referring to FIG. 12, there is no data in PDCP buffer at t=0.

At t=1, the PDCP entity receives PDCP SDU1 with 500 bytes from the upper layer. As an amount of DATP (500 bytes) is less than the TH (700 bytes), the SCG MAC entity transmits BSR to the SeNB to indicate that BS is 500 bytes.

At t=2, the PDCP entity receives PDCP SDU2 with 300 bytes from the upper layer. As an amount of DATP (800 bytes) is above the TH (700 bytes), the MCG MAC entity transmits BSR to the MeNB to indicate that BS is 800 bytes.

At t=3, the PDCP entity receives PDCP SDU3 with 200 bytes from the upper layer. There is no BSR trigger in both MAC entities. The SCG MAC entity receives UL grant with 500 bytes from the SeNB.

At t=4, the PDCP entity transmits PDCP SDU1 to the SeNB via SCG MAC entity using the UL grant received from the SeNB. The DATP becomes 500 bytes which is less than the TH (700 bytes) as PDCP SDU1 is transmitted.

At t=5, the MCG MAC entity receives UL grant with 800 bytes (in response to the transmitted BSR at t=2) from the MeNB.

At t=6, there may be a question, what does the UE transmit on UL grant received from the MeNB at t=5. In this case, three options for UE operation can be considered:

Firstly, UE may not transmit anything to the MeNB (Option 1).

The Option 1 is not conflict with the Agreement (3), because PDCP entity does not transmit PDCP PDU to the MeNB (i.e., eNB which is not configured by ul-DataSplitDRB-ViaSCG). But the Option 1 is conflict with the Agreement (4), because BSR triggering, Buffer Size calculation, and data transmission is not aligned since BSR is triggered to the MeNB but the PDCP PDU is not transmitted to the MeNB.

The Option 1 assumes that data transmission path is determined depending on current buffer status. In the Option 1, UE does not transmit the PDCP SDU2 to the MeNB to which the BSR was transmitted before (at t=2), and therefore the UL grant received (at t=5) from the MeNB would be wasted (e.g., filled with padding).

Secondly, UE may transmit the PDCP SDU, whose size was reported to the MeNB before (e.g., PDCP SDU 2), to the MeNB even if an amount of the DATP is less than the TH (Option 2).

The Option 2 is not conflict with the Agreement (4), because BSR triggering, Buffer Size calculation, and data transmission is aligned since BSR is triggered to the MeNB and PDCP PDU is transmitted to the MeNB. But The Option 2 is conflict with the Agreement (3), because PDCP entity transmits PDCP PDU to the MeNB (i.e., eNB which is not configured by ul-DataSplitDRB-ViaSCG).

The Option 2 assumes that data transmission path is not depending on current buffer status, but depending on whether it has been reported before.

Thirdly, UE may transmit all the available SDUs even if they were not reported to the MeNB (Option3).

The Option 3 is conflict with both of the Agreements (3) and (4), because PDCP entity transmits PDCP PDU to the MeNB (i.e., eNB which is not configured by ul-DataSplitDRB-ViaSCG), and BSR triggering, Buffer Size calculation, and data transmission is not aligned.

The Option 3 assumes that threshold is not used for deciding data transmission path.

In this case, if the UL grant was requested by other MCG bearers, the transmission of other MCG bearers would be delayed. Moreover, the SDU of an UL split bearer may already request UL grant from the SeNB, in which case the UL grant received from the SeNB would be wasted.

Among the Options 1-3, Option 1 may be the worst because the UE may only request UL grant but not utilizing the received UL grant. It increases signaling overhead and also increases radio resource wastage. If the amount of PDCP data is hanging around the threshold, the problem becomes more severe.

The Option 3 has also problem of radio resource wastage as already explained above.

Therefore, the Option 2 may be the most preferable UE operation for an UL split bearer. The radio resource wastage would be minimized with this option. Moreover, the Option 2 is aligned with basic principle that "data is transmitted to the eNB to which BSR is reported".

The Option 2 can be achieved by allowing exceptional case for the Agreement (3). Thus, the present invention proposes that even if an amount of DATP is less than the threshold, PDCP entity is allowed to transmit PDCP PDU for an UL bearer split towards an eNB, which is not indicated by ul-DataSplitDRB-ViaSCG-r12, if the amount of PDCP PDU has been reported to the eNB. A UE operation corresponding to the Option 2 will be discussed with reference to FIG. 13.

Figure 13:
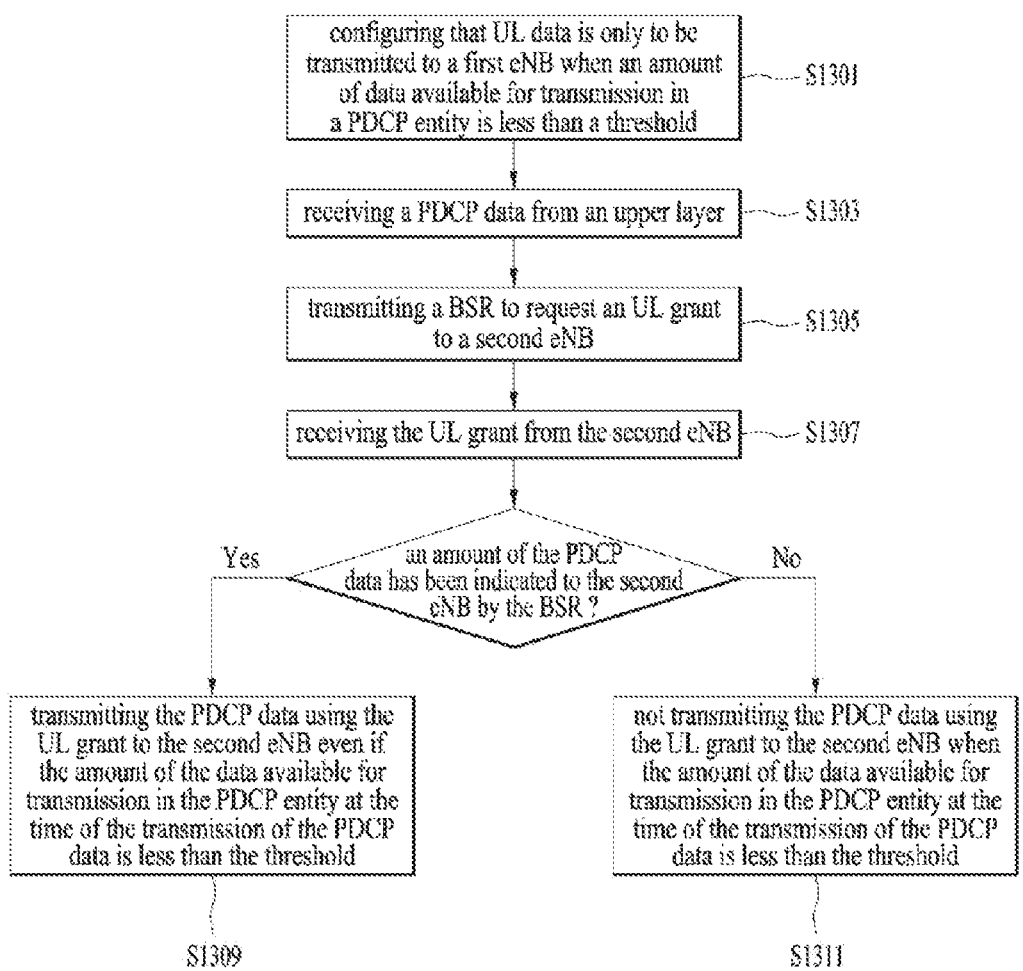
FIG. 13 is conceptual diagram for a UE operation in dual connectivity according to an exemplary embodiment of the present invention.

FIG. 13 is conceptual diagram for a UE operation in dual connectivity according to an exemplary embodiment of the present invention.

To avoid waste of radio resource in an UL split bearer, it is invented that even if an amount of data available for transmission in PDCP (DATP) is lower than (or equal to) a threshold (TH), a UE transmits a PDCP SDU to an eNB which is configured not to transmit the PDCP SDU, if the UE already transmitted a BSR to the eNB indicating the amount of the PDCP SDU and the UE receives an UL grant from the eNB.

If the UE already transmitted the BSR to the eNB but not indicating the amount of the PDCP SDU, the UE does not transmit the PDCP SDU to the eNB which is configured not to transmit the PDCP SDU when the amount of the DATP is lower than (or equal to) the TH even if an UL grant is received from the eNB.

In the present exemplary embodiment, a UE communicates with a first eNB and a second eNB simultaneously. The first eNB may be a SeNB and the second eNB may be a MeNB, or the first eNB may be the MeNB and the second eNB may be the SeNB in the following. A radio bearer comprising one PDCP entity, and two RLC entities, and two MAC entities may be configured for the UE. A threshold, as described in FIG. 12, may be configured for the PDCP entity.

Referring to FIG. 13, the UE configures that UL data is only to be transmitted to the first eNB, if an amount of DATP is less than the threshold (S1301). Meanwhile, if the amount of the DATP is larger than or equal to the threshold, the UE can configure that UL data is to be transmitted to either the first eNB or the second eNB. The configuration may be performed based on a RRC message.

The UE receives a PDCP data from an upper layer (S1303), and transmits a BSR to request an UL grant to the second eNB (S1305). When the BSR is transmitted, an amount of DATP may be larger than or equal to the threshold. This is because, the BSR cannot be transmitted to the second eNB if the amount of the DATP is less than the threshold. After the BSR is transmitted to the second eNB, the UE receives the UL grant from the second eNB (S1307). Meanwhile, between the step S1305 and the step S1307, the UE may transmit a part of DATP to the first eNB using another UL grant, which is received from the first eNB. Therefore, remaining amount of DATP, after the transmission of the part of the PDCP data, may become less than the threshold.

In this case, according to the present exemplary embodiment, whether the PDCP data is transmitted using the UL grant to the second eNB or not can be differently determined, according to whether an amount of the PDCP data has been indicated to the second eNB by the BSR.

More specifically, if an amount of the PDCP data has been indicated to the second eNB by the BSR, the UE transmits the PDCP data using the UL grant to the second eNB even if the amount of the data available for transmission in the PDCP entity at the time of the transmission of the PDCP data is less than the threshold (S1309). That is, for minimizing wastage of radio resources (i.e., the UL grant received from the second eNB), the UE transmits the PDCP data using the UL grant to the second eNB regardless of a restriction configured at the step of S1301. In this case, the PDCP data may be received from the upper layer before the BSR is transmitted to the second eNB.

In contrast, if an amount of the PDCP data has not been indicated to the second eNB by the BSR, the UE does not transmit the PDCP data using the UL grant to the second eNB, when the amount of the data available for transmission in the PDCP entity at the time of the transmission of the PDCP data is less than the threshold (S1311). In this case, the PDCP data may be received from the upper layer after the BSR is transmitted to the second eNB. Preferably, in this case, remaining resources of the UL grant received from the second eNB are filled with padding.

Meanwhile, this issue is discussed for only a case that the amount of the data available for transmission in the PDCP entity at the time of the transmission of the PDCP data is less than the threshold. This is because, if the amount of the data available for transmission in the PDCP entity at the time of the transmission of the PDCP data is larger than or equal to the threshold, the PDCP data can be transmitted using the UL grant to the second eNB, regardless of whether the amount of the PDCP data has been indicated to the second eNB by the BSR or not.

According to the present exemplary embodiment discussed above, wastage of radio resources (i.e., the UL grant received from the second eNB) can be minimized, while the present exemplary embodiment does not conflict with basic principle that "data is transmitted to the eNB to which BSR is reported?. More specific example of UE operation described above will be discussed with reference to FIG. 14.

Figure 14:
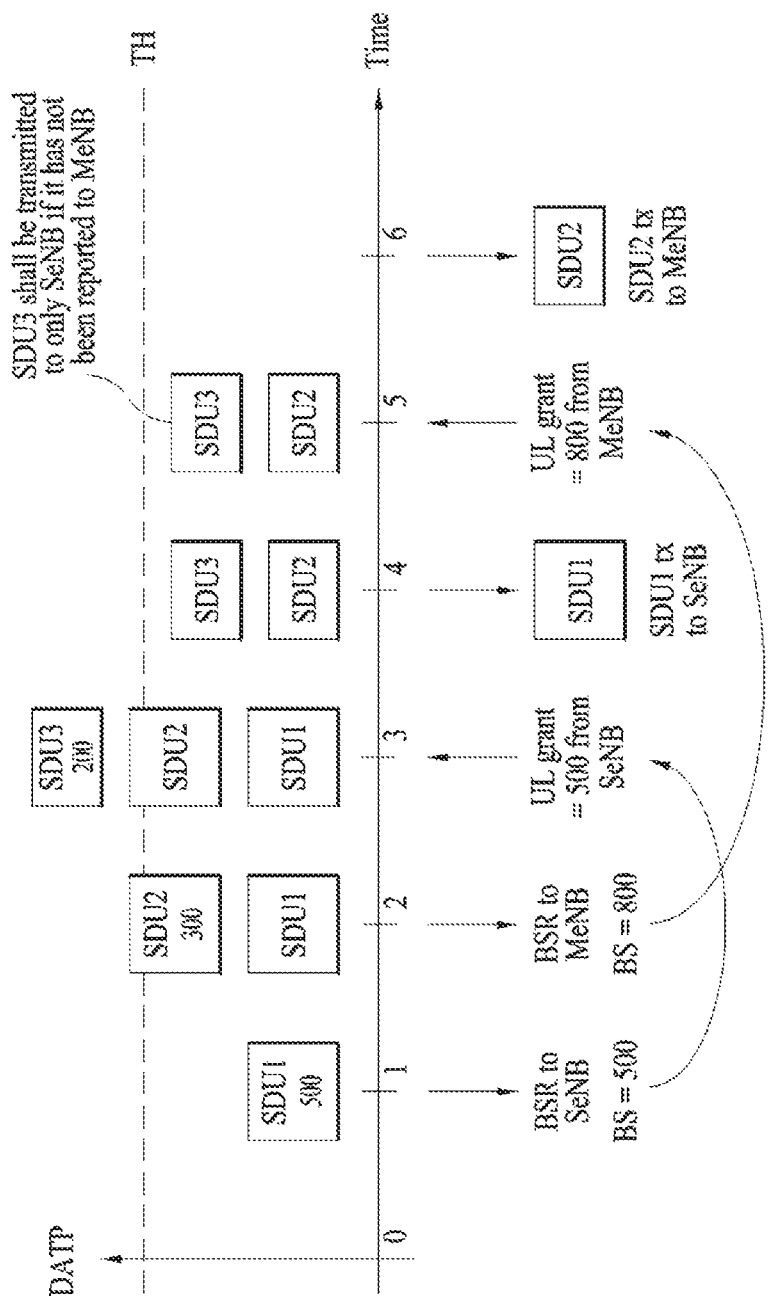
FIG. 14 shows an example of UE operation in dual connectivity according to an exemplary embodiment of the present invention.

FIG. 14 shows an example of UE operation in dual connectivity according to an exemplary embodiment of the present invention.

In FIG. 14, it is assumed that: a threshold (TH) is 700 bytes, a BSR and a PDCP data can be transmitted to SeNB only when an amount of DATP is less than TH, and the BSR and the PDCP data can be transmitted to either SeNB or MeNB when the amount of the DATP is larger than or equal to TH.

Referring to FIG. 14, there is no data in PDCP buffer at t=0.

At t=1, the PDCP entity receives PDCP SDU1 with 500 bytes from the upper layer. As an amount of DATP (500 bytes) is less than the TH, the SCG MAC entity transmits BSR to the SeNB to indicate that BS is 500 bytes.

At t=2, the PDCP entity receives PDCP SDU2 with 300 bytes from the upper layer. As an amount of DATP (800 bytes) is above the TH, the MCG MAC entity transmits BSR to the MeNB to indicate that BS is 800 bytes.

At t=3, the PDCP entity receives PDCP SDU3 with 200 bytes from the upper layer. There is no BSR trigger in both MAC entities. The SCG MAC entity receives UL grant with 500 bytes from the SeNB.

At t=4, the PDCP entity transmits PDCP SDU1 to the SeNB via SCG MAC entity using the UL grant received from the SeNB. The DATP becomes 500 bytes which is less than the TH as PDCP SDU1 is transmitted.

At t=5, the MCG MAC entity receives UL grant with 800 bytes (in response to the transmitted BSR at t=2) from the MeNB.

At t=6, the PDCP entity transmits PDCP SDU2 to the MeNB via MCG MAC entity using the UL grant received from the MeNB even if the DATP is less than the TH, because the size of PDCP SDU2 was already reported to the MeNB at t=2. However, the PDCP entity does not transmit PDCP SDU3 to the MeNB even if the UL grant received from the MeNB can accommodate the PDCP SDU3, because the size of PDCP SDU3 has not been reported to the MeNB. The remaining resource of the UL grant is filled with padding.

In summary, the UE transmits the PDCP SDU to the eNB which is configured not to transmit the PDCP SDU (i.e, MeNB) if the UE already transmitted BSR to the MeNB indicating the amount of PDCP SDU(e.g., PDCP SDU 2) and the UE receives UL grant from the MeNB even if the amount of DATP is lower than (or equal to) the TH. In contrast, if the UE already transmitted BSR to the MeNB but not indicating the amount of PDCP SDU (e.g., PDCP SDU 3), the UE does not transmit the PDCP SDU to the eNB which is configured not to transmit the PDCP SDU (i.e, MeNB) when the amount of DATP is lower than (or equal to) the TH even if UL grant is received from the MeNB.

Meanwhile, if there is buffer status indication during t=4-6, the buffer status may indicated to the SeNB, because an amount of DATP during t=4-6 is less than the TH. As discussed above, PDCP SDU2 is transmitted to the MeNB at t=6, so a route of buffer status indication and a route of data transmission can be different each other, in the present exemplary embodiment.

Figure 15:
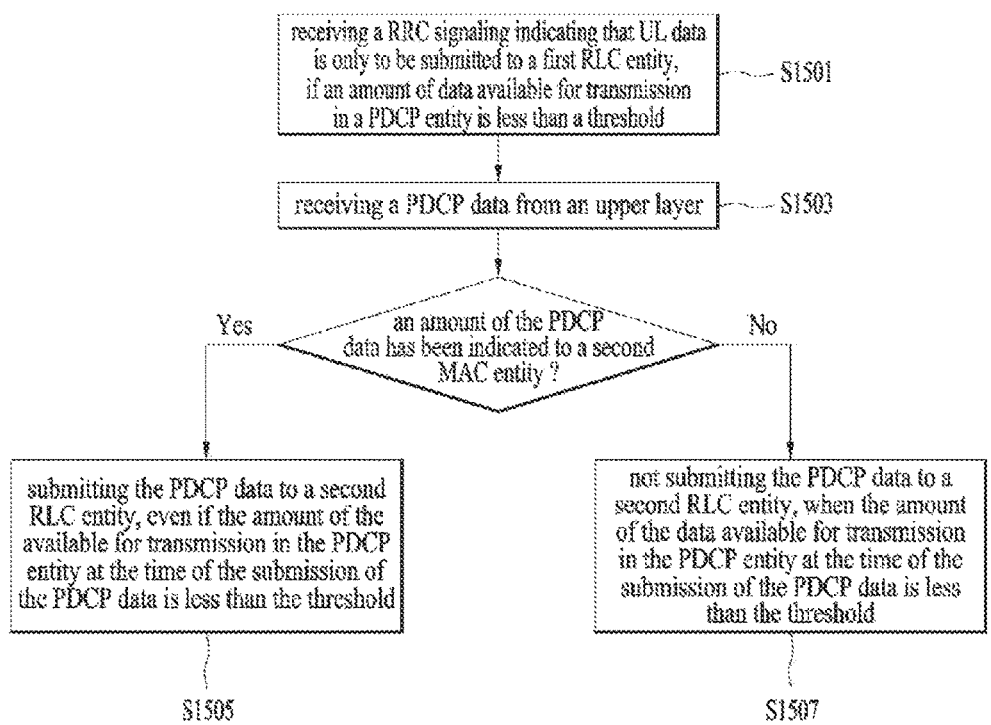
FIG. 15 is conceptual diagram for operation of a PDCP entity in dual connectivity according to an exemplary embodiment of the present invention.

FIG. 15 is conceptual diagram for operation of a PDCP entity in dual connectivity according to an exemplary embodiment of the present invention.

To avoid waste of radio resource in an UL split bearer, it is invented that even if an amount of data available for transmission in PDCP (DATP) is lower than (or equal to) a threshold (TH), a UE transmits a PDCP SDU to an eNB which is configured not to transmit the PDCP SDU, if the UE already transmitted a BSR to the eNB indicating the amount of the PDCP SDU and the UE receives an UL grant from the eNB.

If the UE already transmitted the BSR to the eNB but not indicating the amount of the PDCP SDU, the UE does not transmit the PDCP SDU to the eNB which is configured not to transmit the PDCP SDU when the amount of the DATP is lower than (or equal to) the TH even if an UL grant is received from the eNB.

In the present exemplary embodiment, the PDCP entity is configured for the UL split bearer. More specifically, the PDCP entity is associated with a first RLC entity and a first MAC entity for a first eNB and associated with a second RLC entity and a second MAC entity for a second eNB for a radio bearer. The first eNB may be a SeNB and the second eNB may be a MeNB, or the first eNB may be the MeNB and the second eNB may be the SeNB in the following. A threshold, as described in FIG. 13, may be configured for the PDCP entity.

Referring to FIG. 15, the PDCP entity receives a radio resource control (RRC) signaling indicating that UL data is only to be submitted to a first RLC entity, if an amount of data available for transmission in the PDCP entity is less than a threshold (S1501). Meanwhile, if the amount of the data available for transmission in the PDCP entity is larger than or equal to the threshold, the PDCP entity can configure that UL data is to be submitted to either the first RLC entity or the second RLC entity. The configuration by the PDCP entity may be performed based on a RRC message.

The PDCP entity receives a PDCP data from an upper layer (S1503).

According to the present exemplary embodiment, whether the PDCP data is submitted to the second RLC entity or not can be differently determined, according to whether an amount of the PDCP data has been indicated to the second MAC entity.

More specifically, if the amount of the PDCP data has been indicated to the second MAC entity, the PDCP entity submits the PDCP data to the second RLC entity even if the amount of the data available for transmission in the PDCP entity at the time of the submission of the PDCP data is less than the threshold (S1505).

In contrast, if an amount of the PDCP data has not been indicated to the second MAC entity, the PDCP entity does not submit the PDCP data to the second RLC entity when the amount of the data available for transmission in the PDCP entity at the time of the submission of the PDCP data is less than the threshold (S1507).

Similar to the FIG. 14, this issue is discussed for only a case that the amount of the data available for transmission in the PDCP entity at the time of the transmission of the PDCP data is less than the threshold.

An exemplary proposal regarding each of PDCP entities and Data available for transmission to TS36.323 is described below.

For split bearers, routing is performed in the transmitting PDCP entity, and reordering is performed in the receiving PDCP entity. When submitting PDCP PDUs to lower layers, the transmitting PDCP entity shall:
  if ul-Data SplitThreshold is configured and the data available for transmission is larger than (or equal to) ul-Data SplitThreshold, or;
  if data available for transmission for the PDCP PDUs has been included in the BSR of both the MAC entity configured for SCG and the MAC entity configured for MCG, or;
  if data available for transmission for the PDCP PDUs has been indicated to both the MAC entity configured for SCG and the MAC entity configured for MCG:
    submit the PDCP PDUs to either the associated AM RLC entity configured for SCG or the associated AM RLC entity configured for MCG;
  else:
    if ul-DataSplitDRB-ViaSCG is set to TRUE by upper layers:
      submit the PDCP PDUs to the associated AM RLC entity configured for SCG;
    else:
      submit the PDCP PDUs to the associated AM RLC entity configured for MCG.

For split bearers, when indicating the data available for transmission to the MAC entity for BSR triggering and Buffer Size calculation, the UE shall:
  if ul-Data SplitThreshold is configured and data available for transmission is larger than (or equal to) ul-Data SplitThreshold:
    indicate the data available for transmission to any of the MAC entities configured for SCG and MCG;
  else:
    if ul-DataSplitDRB-ViaSCG is set to TRUE by upper layer:
      indicate the data available for transmission to the MAC entity configured for SCG only;
    else:
      indicate the data available for transmission to the MAC entity configured for MCG only.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a user equipment (UE) communicating with a first base station (BS) and a second BS simultaneously in a wireless communication system, the method comprising:
   configuring, based on a radio resource control (RRC) signal from the first BS or the second BS, that uplink (UL) data is to be transmitted to the first BS for when an amount of data available for transmission in a packet data convergence protocol (PDCP) entity is less than a threshold;
   receiving a first PDCP data from an upper layer;
   transmitting a buffer status report (BSR) for the first PDCP data to request an UL grant to the second BS;
   receiving a second PDCP data from the upper layer;
   receiving the UL grant from the second BS in response to the BSR; and
   transmitting both of the first PDCP data and the second PDCP data on the UL grant to the second BS even when an amount of the data available for transmission in the PDCP entity at the time of a transmission of the first PDCP data and the second PDCP data is less than the threshold.

2. The method according to claim 1,
   wherein remaining resources of the UL grant received from the second BS are filled with padding.

3. The method according to claim 1, further comprising: configuring the threshold for the PDCP entity.

4. The method according to claim 1,
   wherein the first BS is a secondary BS and the second BS is a master BS, or the first BS is the master BS and the second BS is the secondary BS.

5. The method according to claim 1,
   wherein a radio bearer for the first PDCP data comprises one PDCP entity, and two radio link control (RLC) entities, and two medium access control (MAC) entities.

6. A method for a user equipment (UE) communicating with a first Base Station (BS) and a second BS simultaneously in a wireless communication system, the method comprising:
   receiving, by a packet data convergence protocol (PDCP) entity, a radio resource control (RRC) signaling indicating that uplink (UL) data is only to be submitted to a first radio link control (RLC) entity if an amount of data available for transmission in the PDCP entity is less than a threshold, wherein the PDCP entity is associated with the first RLC entity and a first medium access control (MAC) entity for the first BS and associated with a second RLC entity and a second MAC entity for the second BS for a radio bearer;
   receiving, by the PDCP entity, a first PDCP data from an upper layer and a second PDCP data from the upper layer; and
   submitting, by the PDCP entity, the first PDCP data and the second PDCP data to the second RLC entity when an amount of the first PDCP data has been indicated to the second MAC entity without an amount of the second PDCP data, wherein an amount of the data available for transmission in the PDCP entity at a time of the submission of the first PDCP data and the second PDCP data is less than the threshold.

7. The method according to claim 6, further comprising: configuring the threshold for the PDCP entity.

8. The method according to claim 6,
   wherein the first BS is a secondary BS and the second BS is a master BS, or the first BS is the master BS and the second BS is the secondary BS.

9. A User Equipment (UE) for communicating with a first base station (BS) and a second BS simultaneously in a wireless communication system, the UE comprising:
   a Radio Frequency (RF) module; and
   a processor operably coupled with the RF module and configured to:

configure, based on a radio resource control (RRC) signal from the first BS or the second BS, that uplink (UL) data is to be transmitted to the first, if BS for when an amount of data available for transmission in a packet data convergence protocol (PDCP) entity is less than a threshold;

receive a first PDCP data from an upper layer;

transmit a buffer status report (BSR) for the first PDCP data to request an UL grant to the second BS;

receive a second PDCP data from the upper layer;

receive the UL grant from the second BS in response to the BSR; and transmit both of the first PDCP data and the second PDCP data on the UL grant to the second BS even when an amount of the data available for transmission in the PDCP entity at a time of the transmission of the first PDCP data and the second PDCP data is less than the threshold.

10. The UE according to claim 9, wherein remaining resources of the UL grant received from the second BS are filled with padding.

11. The UE according to claim 9, wherein the processor is further configured to:

configure the threshold for the PDCP entity.

12. The UE according to claim 9, wherein the first BS is a secondary BS and the second BS is a master BS, or the first BS is the master BS and the second BS is the secondary BS.

13. The UE according to claim 9, wherein a radio bearer for the PDCP data comprises one PDCP entity, and two radio link control (RLC) entities, and two medium access control (MAC) entities.

14. A User Equipment (UE) for communicating with a first base station (BS) and a second BS simultaneously in a wireless communication system, the UE comprising:

a Radio Frequency (RF) module; and a processor operably coupled with the RF module and configured to:

receive, by a packet data convergence protocol (PDCP) entity, a radio resource control (RRC) signaling indicating that uplink (UL) data is only to be transmitted to the first BS, if an amount of data available for transmission in the PDCP entity is less than a threshold, wherein the PDCP entity is associated with a first radio link control (RLC) entity and a first medium access control (MAC) entity for the first BS and associated with a second RLC entity and a second MAC entity for the second BS for a radio bearer;

receive, by the PDCP entity, a first PDCP data from an upper layer and a second PDCP data from the upper layer; and submit, by the PDCP entity, the first PDCP data and the second PDCP data to the second RLC entity when an amount of the first PDCP data has been indicated to the second MAC entity without an amount of the second PDCP data, wherein the amount of the data available for transmission in the PDCP entity at a time of the submission of the PDCP data is less than the threshold.

15. The UE according to claim 14, wherein the processor is further configured to:

configure the threshold for the PDCP entity.

16. The UE according to claim 14, wherein the first BS is a secondary BS and the second BS is a master BS, or the first BS is the master BS and the second BS is the secondary BS.

* * * * *